United States Patent
Uchida et al.

(10) Patent No.: US 6,774,370 B1
(45) Date of Patent: Aug. 10, 2004

(54) POSITRON IMAGING DEVICE

(75) Inventors: Hiroshi Uchida, Hamamatsu (JP);
Takaji Yamashita, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 160 days.

(21) Appl. No.: 10/129,733

(22) PCT Filed: Nov. 10, 2000

(86) PCT No.: PCT/JP00/07958

§ 371 (c)(1),
(2), (4) Date: May 10, 2002

(87) PCT Pub. No.: WO01/36996

PCT Pub. Date: May 25, 2001

(30) Foreign Application Priority Data

Nov. 12, 1999 (JP) .......................................... 11-322873

(51) Int. Cl.[7] .............................................. G01T 1/164
(52) U.S. Cl. .............................. 250/363.03; 250/363.02
(58) Field of Search ....................... 250/363.03, 363.02, 250/363.01, 361 R, 336.1, 336.2

(56) References Cited

U.S. PATENT DOCUMENTS

| 5,773,829 | A | * | 6/1998 | Iwanczyk et al. ........... 250/367 |
| 5,866,907 | A | * | 2/1999 | Drukier et al. ............. 250/366 |
| 6,057,551 | A | * | 5/2000 | Tararine ................. 250/363.03 |
| 6,373,059 | B1 | * | 4/2002 | Stearns et al. .......... 250/363.03 |
| 6,420,711 | B2 | * | 7/2002 | Tumer .................... 250/370.09 |
| 2003/0038240 | A1 | * | 2/2003 | Weinberg .............. 250/363.02 |

FOREIGN PATENT DOCUMENTS

| JP | 58-14071 | 1/1983 |
| JP | 59-46571 | 3/1984 |
| JP | 2-167488 | 6/1990 |
| JP | 8-211154 | 8/1996 |
| JP | 9-33658 | 2/1997 |

* cited by examiner

*Primary Examiner*—David Porta
*Assistant Examiner*—Christine Sung
(74) *Attorney, Agent, or Firm*—Morgan, Lewis & Bockius LLP

(57) ABSTRACT

A first detector group 1 and a second detector group 2, disposed opposite to each other and detecting gamma ray pairs resulting from electron-positron pair annihilation, are each constituted by two two-dimensional radiation detectors $10_1$, and $10_2$, $20_1$, and $20_2$, and arranged so that a prescribed arrangement spacing L2 is established between the scintillator arrays 11 and 21. Furthermore, the coincidence counting circuit 50 of the signal processing circuit 5 is constituted so as to carry out coincidence counting for diagonally disposed detectors as well as oppositely disposed detectors. Accordingly, the are a between the ranges of the fields of view resulting from opposite detectors is supplemented by a range of the field of view resulting from diagonally disposed detectors. Consequently, it becomes possible to attain a positron imaging device wherein the range of the field of view is efficiently expanded, and the simplification and cost reduction of the device are realized.

8 Claims, 9 Drawing Sheets

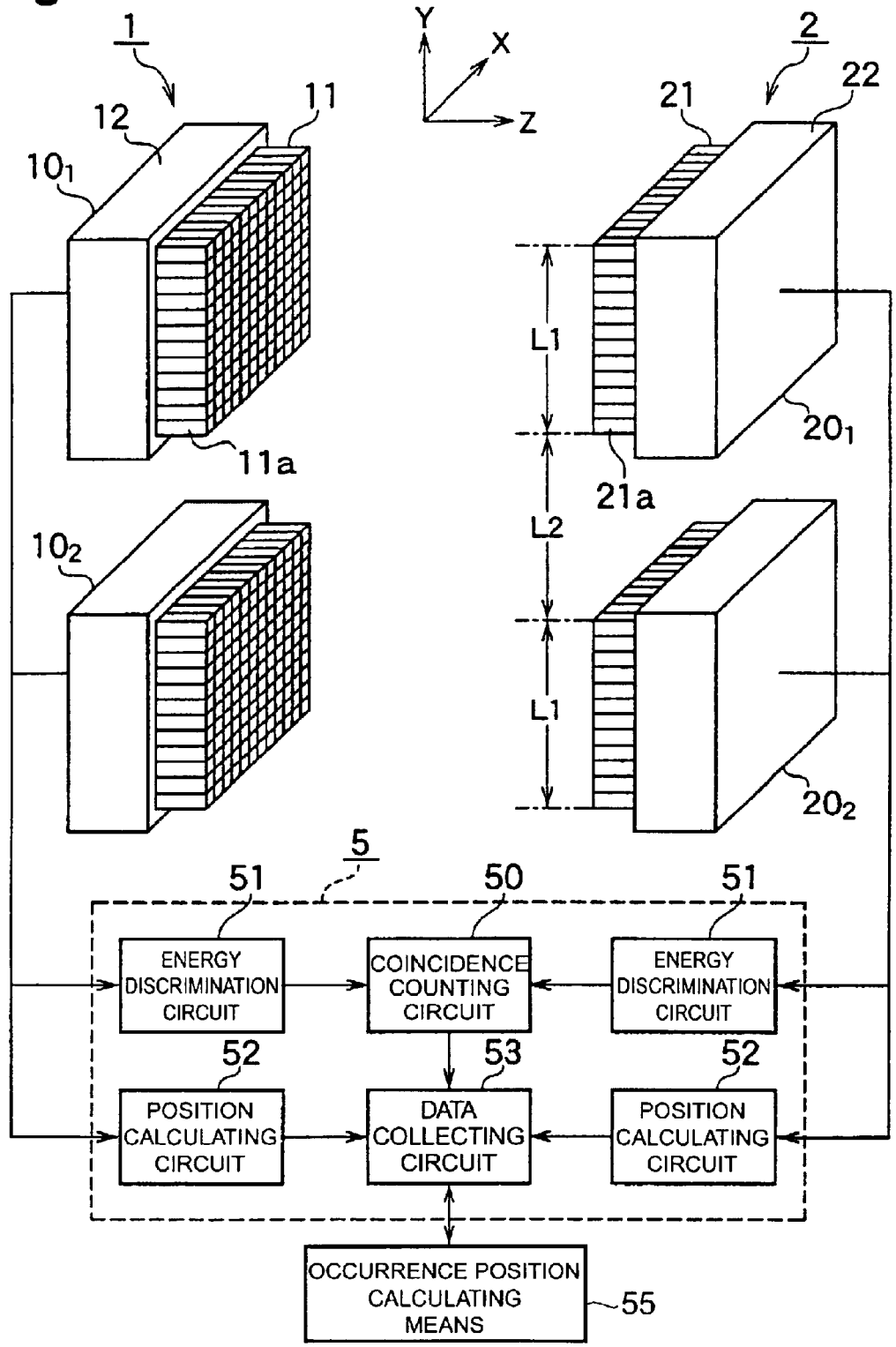

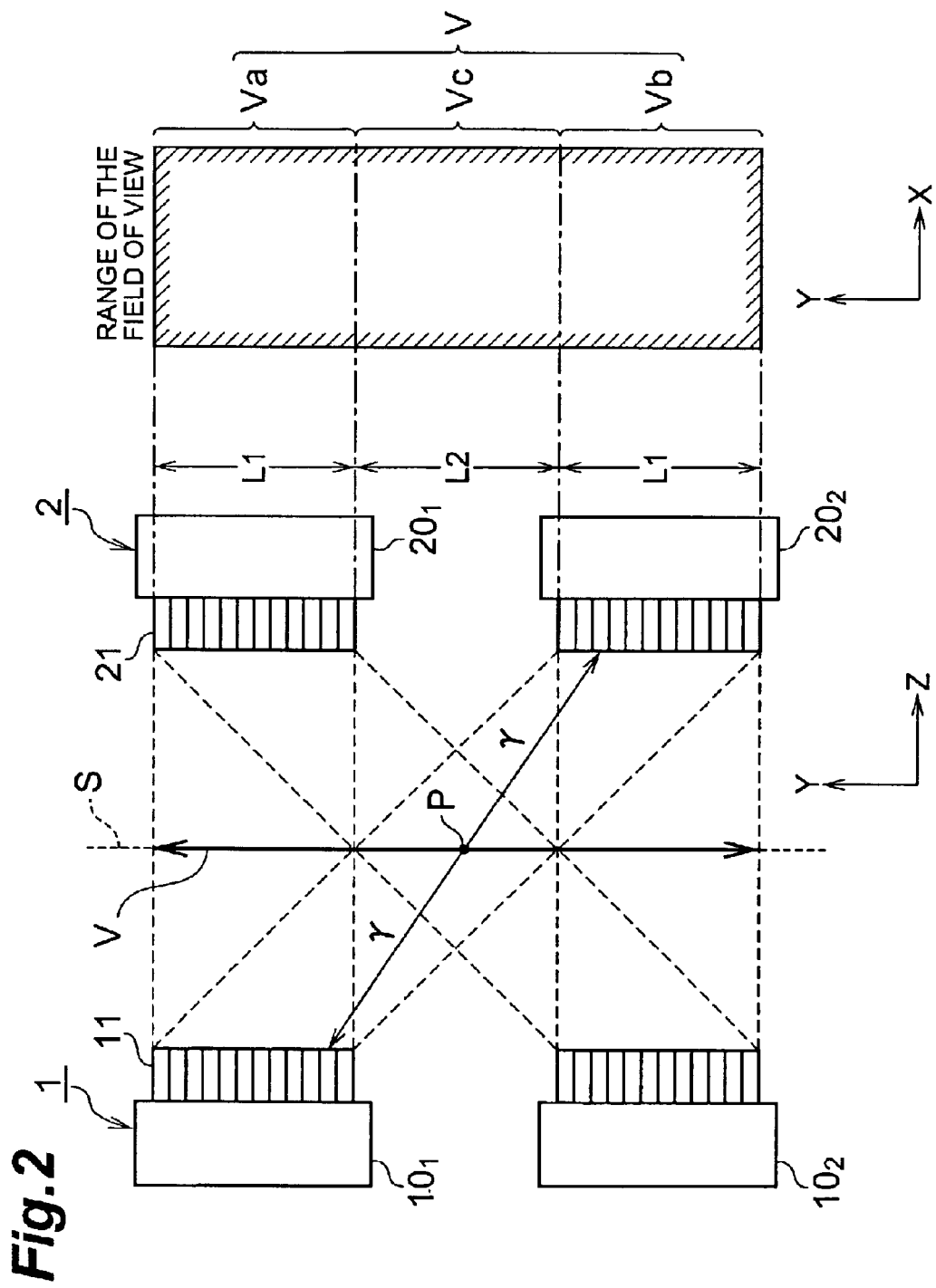

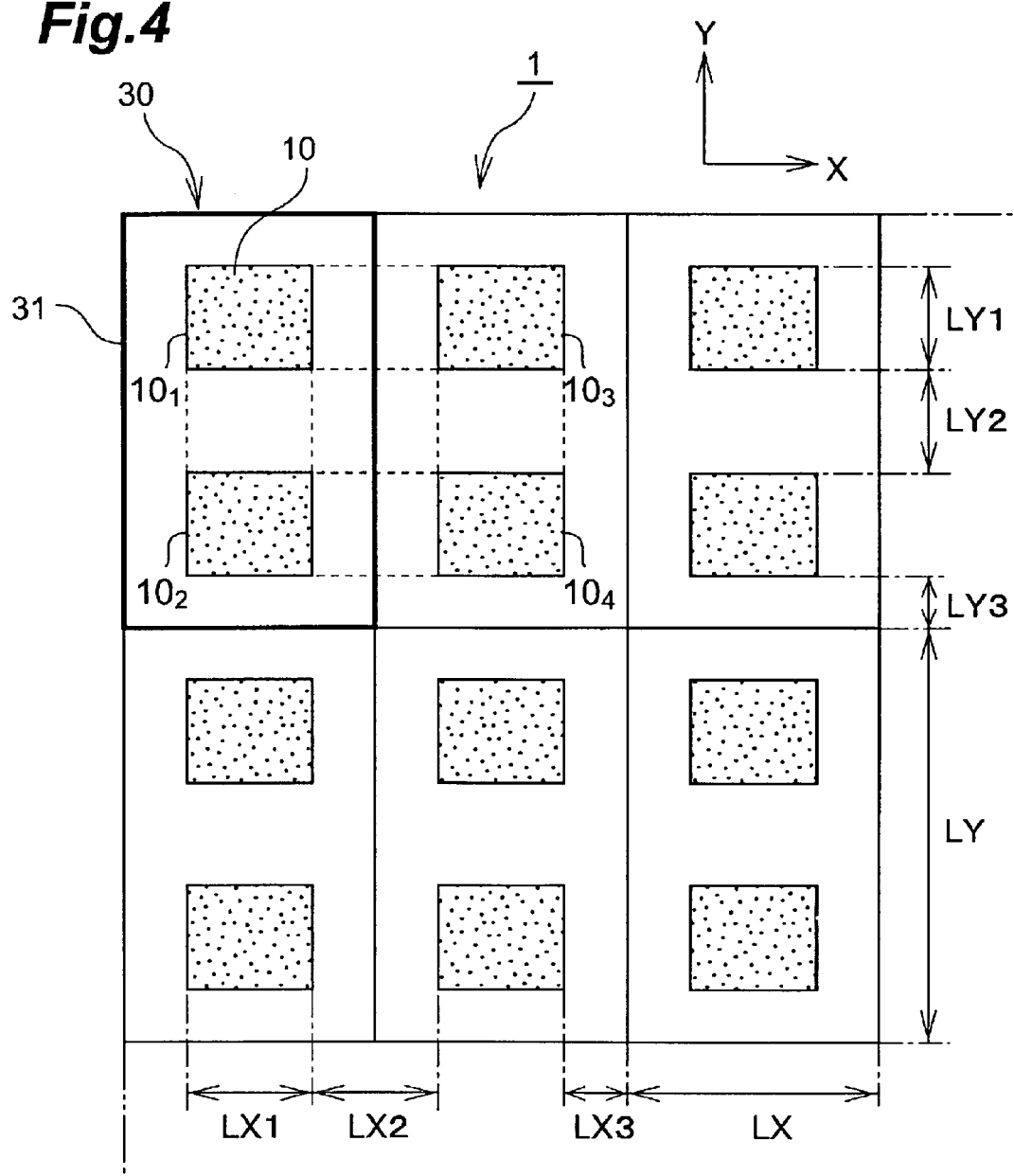

US 6,774,370 B1

POSITRON IMAGING DEVICE

TECHNICAL FIELD

The present invention relates to a positron imaging device for attaining information such as the distribution of matter in a measured subject.

BACKGROUND ART

A positron imaging device is that which attains information on a measured subject, such as a human body, an animal, or a plant, by the injection as a tracer of a material marked with radioactive isotopes (RI) for emitting positrons, and measuring gamma ray pairs generated by the pair annihilation of the positrons emitted by the RI material with electrons present in normal matter (for example, see Japanese Patent Application Laid-open No. H09-33658).

A gamma ray pair generated by the electron-positron pair annihilation has energy approximately equivalent to the mass of the electron or positron (511 keV) and the rays are emitted in mutually opposite directions. Consequently, it becomes possible to measure the distribution of matter or the like at each position in the measured subject by coincidently counting the gamma ray pairs with radiation detectors disposed with the measured subject therebetween and identifying the locations at which pair annihilation occurs.

Devices with a number of constitutions such as the positron CT device have been proposed or developed as positron imaging devices. One such device detects gamma ray pairs with a pair of two-dimensional radiation detectors disposed opposite to each other. This type of device is used for the measurement of relatively flat measured subjects placed at a position between the two two-dimensional radiation detectors, for example, such as the measurement of plant materials. It is also possible for such a device to be used for items with thickness.

FIG. 8 shows the basic constitution of this type of positron imaging device. This device comprises a pair of two-dimensional radiation detectors 60 and 70. The two-dimensional radiation detectors 60 and 70 each comprise scintillator arrays 61, 71 comprising a plurality of scintillators, and photodetectors 62, 72 for detecting the scintillation light generated by gamma rays incident on the scintillator arrays 61, 71. The radiation detectors 60 and 70 are disposed within detector cases 65, 75 so that the radiation incident surfaces of the scintillator arrays 61, 71 are opposite to each other.

In this constitution, the pair of gamma rays emitted from the measured subject A disposed on a prescribed measurement surface S between the radiation detectors 60 and 70 is detected by both the radiation detectors 60 and 70. Those detection signals are output through circuit systems 63, 73, each comprising an amp circuit or the like for amplifying the detection signal. The detection signal output is input to a signal processing circuit 8 and the signal processing circuit 8 specifies the electron-positron pair annihilation event by coincidence counting based on the detection signals from the radiation detectors 60 and 70 and performs calculations and so forth of the position at which the pair annihilation occurred.

DISCLOSURE OF THE INVENTION

For the positron imaging device with the constitution discussed above, the area of the field of view must be expanded in order for the efficient measurement of various measured subjects. In the constitution of the device with the mutually opposite radiation detectors, the area of the region of the radiation incident surface, in each of the mutually opposite radiation detectors, becomes the area of the field of view that can be measured.

FIG. 9 is a side view showing the expansion of the range of the field of view in the case of two pairs of opposite radiation detectors. This imaging device has a measurement surface S, whereon the measured subject such as a plant is disposed, held between two opposite detector groups 6 and 7. The detector groups 6 and 7 are each constituted by two radiation detectors $60_1$, and $60_2$ and $70_1$ and $70_2$. In this constitution, the range of the field of view Ve is formed from the opposite radiation detectors $60_1$ and $70_1$ and the range of the field of view Vf is formed from the radiation detectors $60_2$ and $70_2$. As shown with a plan view of this range of the field of view on the right end of the figure, double the range of the field of view V is attained as a whole, as opposed to the constitution using only one pair of detectors.

The expansion of the abovementioned range of the field of view is equivalent to the case of simply disposing two adjacent imaging devices each comprising one pair of radiation detectors. The efficiency of this expansion of the field of view is poor. In particular, in such a method for expanding the range of the field of view, the number of radiation detectors disposed increases in proportion to the area of the field of view to be attained. The increased cost of the device with the expansion of the field of view becomes therefore problematic.

The present invention was developed in view of the abovementioned problems and it is an object of the present invention to provide a positron imaging device wherein the range of the field of view is efficiently expanded, while the constitution of the device is simplified and the costs are reduced.

In order to achieve this object, the positron imaging device according to the present invention is a positron imaging device for attaining an image of a measured subject by coincidence counting of a gamma ray pair generated by electron-positron pair annihilation in the measured subject and emitted in mutually opposite directions; and this device comprises: (1) a first detector group having a prescribed number, that is two or more, of radiation detectors including radiation detecting portions constituted so that two-dimensional position detection is possible, in which each of the radiation detectors is arranged so that the radiation detecting portion is disposed with an arrangement spacing from the radiation detecting portion of the radiation detector adjacent thereto; (2) a second detector group having the prescribed number of the radiation detectors and in which each of the radiation detectors is arranged so as to be opposite the corresponding radiation detectors of the first detector group; and (3) signal processing means to which are input a first detection signal output from the first detector group and a second detection signal output from the second detector group, and for carrying out coincidence counting of the first detection signal and the second detection signal; (4) wherein the signal processing means carry out coincidence counting of the first detection signal output from each of the radiation detectors constituting the first detector group with the second detection signals output from a plurality of the radiation detectors including the opposed radiation detector from among the radiation detectors constituting the second detector group.

In the abovementioned imaging device, the two detector groups disposed opposite to each other are constituted from a plurality of two-dimensional radiation detectors and are disposed so that the radiation detectors in the detector groups have spacing between the detecting portions. Furthermore, the signal processing means for carrying out coincidence counting for the two detector groups are constituted so as to perform coincidence counting for the diagonally disposed detectors as well as the detectors disposed directly opposite to the detectors constituting each of the detector groups.

At this time, the area between the detecting portions becomes the range of the field of view resulting from coincidence counting for the detectors disposed directly opposite from each other. Meanwhile all or part of the area between the detecting portions arranged with spacing therebetween supplemented by coincidence counting for the detectors disposed diagonally to each other and becomes the range of the field of view. Consequently, it becomes possible to supplement the area between detectors and realize an efficient expansion of the range of the field of view with a detector arrangement including spacing and by coincidence counting for oppositely and diagonally disposed detectors. At this time, a greater rate of expansion of the range of the field of view is attained than a rate of increase of the detectors.

Because of problems in the constitution of two-dimensional radiation detectors, spacing necessarily is formed between the detecting portions when a plurality of detectors is arranged. However, in this case as well, it becomes possible to supplement the insensitive region, due to the spacing between the detecting portions, and have a measurable range of the field of view with the device constitution discussed above.

Moreover, for the detector arrangement with spacing, various arrangements may be used and the arrangement spacing need not be uniform for the entire detector group.

BRIEF DESCRIPTION OF THE DRAWINGS

FIG. 1 is a drawing showing the constitution of a first embodiment of a positron imaging device;

FIG. 2 is a side view and plan view showing the expansion of the range of the field of view in the positron imaging device shown in FIG. 1;

FIG. 4 is a drawing showing the constitution of a second embodiment of the positron imaging device;

BEST MODES FOR CARRYING OUT THE INVENTION

The preferred embodiments of the positron imaging device relating to the present invention are explained in detail below along with the drawings. Moreover, in the explanation of the drawings the same numerals or letters are used for the same elements and redundant explanations are omitted. Also, the dimensional ratios of the drawings do not necessarily match those of the explanation.

Figure 8:
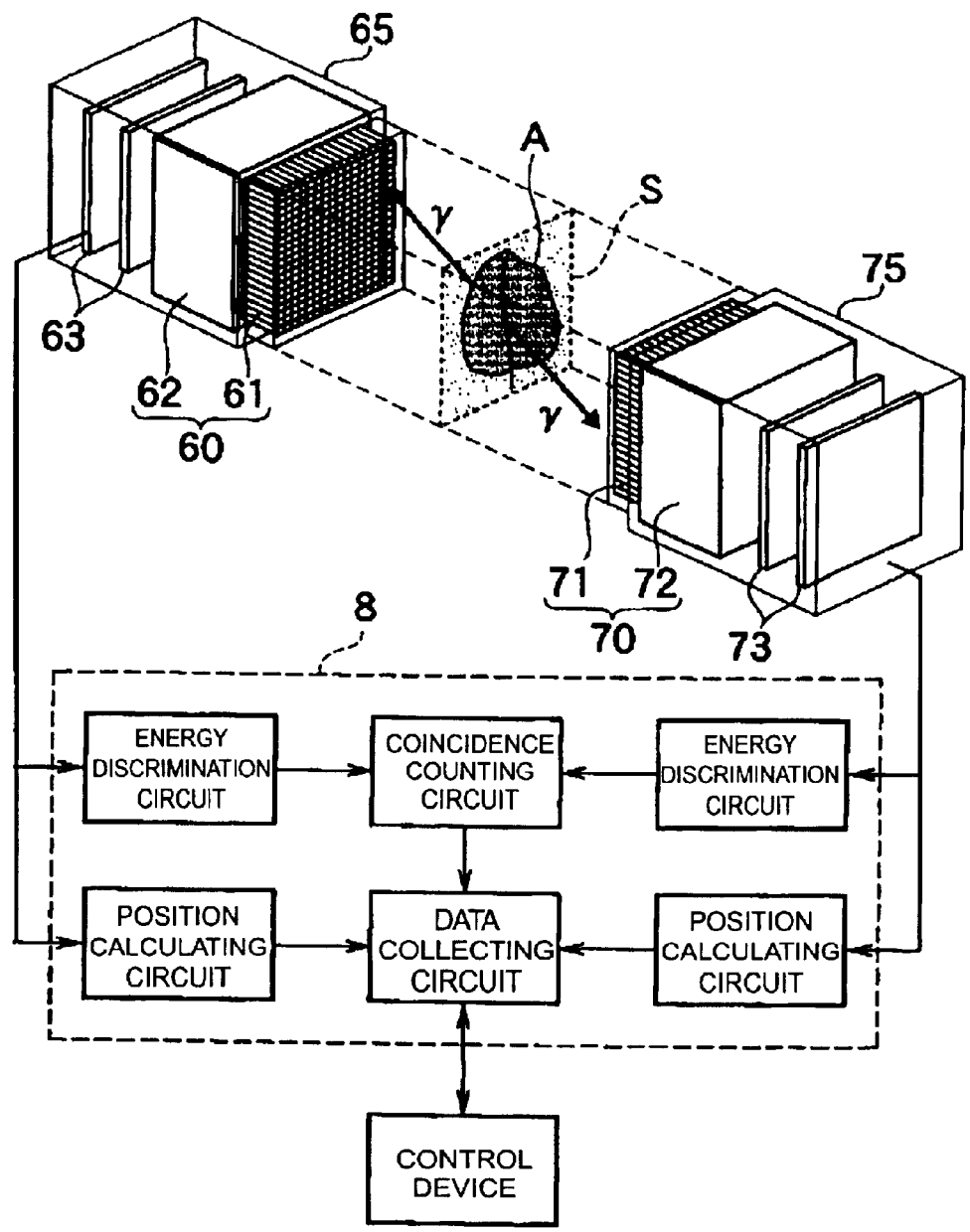
FIG. 8 is a drawing showing the basic constitution of a positron imaging device wherein a pair of two-dimensional radiation detectors is disposed oppositely.

FIG. 1 is a drawing showing the constitution of a first embodiment of the positron imaging device relating to the present invention. This imaging device is constituted with two detector groups, a first detector group 1 and a second detector group 2, each comprising a plurality of radiation detectors. Moreover, in FIG. 1 these detector groups 1 and 2 are illustrated with a perspective view, showing the structure wherein these are mutually opposite. Also, relating to this structural arrangement, as shown with the coordinate axes in this drawing, the detector pairs are in opposition along the Z axis; the X and Y axis show the two directions defining the plane perpendicular to this direction of opposition. The X, Y, and Z axes are defined in the same way for each of the embodiments shown below. Also, drawings and explanations are omitted for the circuit systems and so forth (see FIG. 8) associated with each of the radiation detectors.

The first detector group 1 comprises two two-dimensional radiation detectors $10_1$ and $10_2$. The radiation detectors $10_1$ and $10_2$ in the present embodiment each comprise a scintillator array 11 which is a radiation detecting portion constituted to make possible two-dimensional position detection. The scintillator array 11 is constituted such that each of the radiation incident surfaces is square (rectangular or square), the plurality of scintillators 11a of the same form is arranged in a two-dimensional array, and the radiation incident surface of the scintillator array 11 has a rectangular form overall.

A two-dimensional position detecting-type of photomultiplier tube 12, such as the multi-anode type, is connected to the surface of the scintillator array 11 opposite to the radiation incident surface. The position detecting-type of photomultiplier tube 12 is a photodetector for detecting the scintillation light occurring in the scintillators 11a of the scintillator array 11 from the incident radiation such as gamma rays. With this position detecting function it is possible to specify the scintillator 11a where the scintillation light occurred, from among the plurality of scintillators 11a constituting the scintillator array 11 connected thereto.

Also, the external form of this position detecting-type photomultiplier tube 12 and the form of the light receiving surface connected to the scintillator array 11 are rectangular and greater in size than the scintillator array 11. This is a constitution and connection method whereby it is possible to detect all the scintillation light from each scintillator 11a in the scintillator array 11. Moreover, the external form of the position detecting-type photomultiplier tube and form of the light receiving surface may also be made rectangular and smaller in size than the scintillator array through the use of a light guide or the like.

The second detector group 2 comprises two two-dimensional radiation detectors $20_1$ and $20_2$. Like the radiation detectors $10_1$ and $10_2$ in the first, detector group 1, the radiation detectors $20_1$ and $20_2$ each comprise a scintillator array 21 of scintillators 21a arranged in a two-dimensional array, and a two-dimensional position detecting-type photomultiplier tube 22 connected to the scintillator array 21.

The radiation detectors $10_1$ and $10_2$, and $20_1$ and $20_2$ are disposed with the central axis of each on the Z axis direction whereon the detector groups 1 and 2 are in opposition, and the two directions of the two-dimensional array arrangement of the scintillators 11a and 21a of the scintillator arrays 11 and 21 of each detector match the X axis and Y axis directions perpendicular to this direction of opposition. Also, the central axis of the radiation detector $10_1$ matches the central axis of the radiation detector $20_1$, and the central axis of the radiation detector $10_2$ matches the central axis of the radiation detector $20_2$. The detector groups 1 and 2 thereby have a constitution wherein the radiation incident surfaces of each radiation detector form an X-Y plane perpendicular to the Z axis, and the radiation incident surfaces of the radiation detectors $10_1$ and $20_1$, and the radiation incident surfaces of the radiation detectors $10_2$ and $20_2$ are disposed so as to be mutually opposite.

The radiation detectors $10_1$ and $10_2$ constituting the first detector group 1 are arranged with spacing therebetween in the direction of the Y axis, so that the distance between the each of the scintillator arrays 11 becomes a prescribed arrangement spacing. Likewise, the radiation detectors $20_1$ and $20_2$ constituting the second detector group 2 are arranged with spacing therebetween in the direction of the Y axis so that the distance between each of the scintillator arrays 21 becomes the same arrangement spacing as in the first detector group 1. In FIG. 1, the length on the Y axis of the scintillator arrays 11 and 21 is L1 and the abovementioned arrangement spacing (detecting portion arrangement spacing) of the scintillator arrays 11 and 21 is L2. The design and so forth of this arrangement spacing is explained below.

The object which is the measured subject of the imaging device is placed on the prescribed measurement surface held between the detector groups 1 and 2 (not shown in FIG. 1) or at a location in the vicinity thereof. The measurement subject may be an animal or plant into which material marked with a radioactive isotope (RI) for emitting positrons has been injected as a tracer. For this type of measurement subject, information such as the distribution of matter in the measurement subject can be attained by measuring the pairs of gamma rays generated by the pair annihilation of the positrons emitted from the RI material in the tracer with the electrons normally present in matter.

In the detection of gamma rays by each of the radiation detectors $10_1$ and $10_2$, $20_1$ and $20_2$, scintillation light is generated in the scintillators $11a$ and $21a$ which received gamma rays. That scintillation light reaches the light receiving surfaces of the photomultiplier tubes 12 and 22 and undergoes photoelectric conversion. After being multiplied, the detection signals are output from the photomultiplier tubes 12 and 22. The detection signals output from each of the radiation detectors are then input to a signal processing circuit 5 for carrying out coincidence counting of gamma ray pairs based on those detection signals, the identification of electron-positron pair annihilation events, and calculations and so forth for detecting the gamma ray positions.

The detection signal (first detection signal) from the radiation detector $10_1$ or $10_2$ of the first detector group 1, and the detection signal (second detection signal) from the radiation detector $20_1$ or $20_2$ of the second detector group 2 are each input to the signal processing circuit 5, and the energy of the detected gamma ray is discriminated with an energy discrimination circuit 51. Energy discrimination is carried out, for example, by selecting the detection signal which is at or above a prescribed threshold signal level as a signal resulting from gamma ray detection. Unnecessary signals are thereby removed, such signals include noise signals from low electrical signal levels, and noise signals resulting from scattered gamma rays (these are gamma ray pairs wherein one or both of the annihilation gamma rays has its direction changed by scattering matter; the energy is reduced because of scattering).

After each detection signal has undergone energy discrimination, coincidence counting with the first detection signal and second detection signal is carried out in the coincidence counting circuit 50. Events for which gamma rays are coincidently detected by the first detector group 1 and second detector group 2 are selected as electron-positron pair annihilation events used for measurement. Also, the detection position of the gamma rays in each detection detector group 1 and 2 is calculated on the basis of each of the detection signals in the position calculating circuit 52.

Furthermore, for events selected as those to be used for measurement in the coincidence counting circuit 50, data necessary for measurement, such as data on the gamma ray detection position calculated with the position calculating circuit 52 are collected by the data collecting circuit 53. Also, in the present embodiment, this data collecting circuit 53 is further connected to the occurrence position calculating means 55. In the occurrence position calculating means 55, the position at which the electron-positron pair annihilation occurred in the measured subject is calculated from data on the gamma ray detection position and so forth collectedly the data collecting circuit 53. Otherwise, image data such as the distribution of occurrence are generated from this position of occurrence. From these data, information relating to the measured subject such as the distribution of the matter injected as a tracer to the measured subject can be investigated.

The occurrence position calculating means 55 may be a circuit system installed in the signal processing circuit 5, for example, or the data collecting circuit 53 may be connected to a control device such as a computer (see FIG. 8), carry out calculations with this computer, and carry out the calculation of the position of occurrence. Also, in the case of using a computer as the occurrence position calculating means 55, the computer may also be caused to carry out the control of data collection and the display of the collected data on a display, and so forth.

In particular, the coincidence counting circuit 50 of the signal processing circuit 5 in the present embodiment is not only constituted by the set of radiation detectors disposed directly opposite each other in the detector groups 1 and 2, meaning a combination of the radiation detectors $10_1$ and $20_1$, or the radiation detectors $10_2$ and $20_2$. The coincidence counting circuit 50 is also constituted so as to carry out coincidence counting in the same way with the set of diagonally disposed radiation detectors, meaning the radiation detectors $10_1$ and $20_2$ or the radiation detectors $10_2$ and $20_1$. In other words, coincidence counting is carried out for both the second detection signals from the radiation detector $20_1$ or $20_2$ from the second detector group 2 corresponding to each of the first detection signals from the radiation detector $10_1$ or $10_2$ in the first detector group 1.

The effects of enlarging the range of the field of view with the device constitution and coincidence counting method discussed above are explained. FIG. 2 is a side view from the X axis direction of the positron imaging device shown in FIG. 1. The signal processing circuit 5 is not shown.

The measurement surface S, whereon the measured subject is disposed when imaging is carried out, is established at a prescribed position between the two opposite detector groups 1 and 2 in the XY plane perpendicular to the central axis of each of the radiation detectors. In FIG. 2, this measurement surface S is established at a central position between the detector groups 1 and 2.

Figure 9:
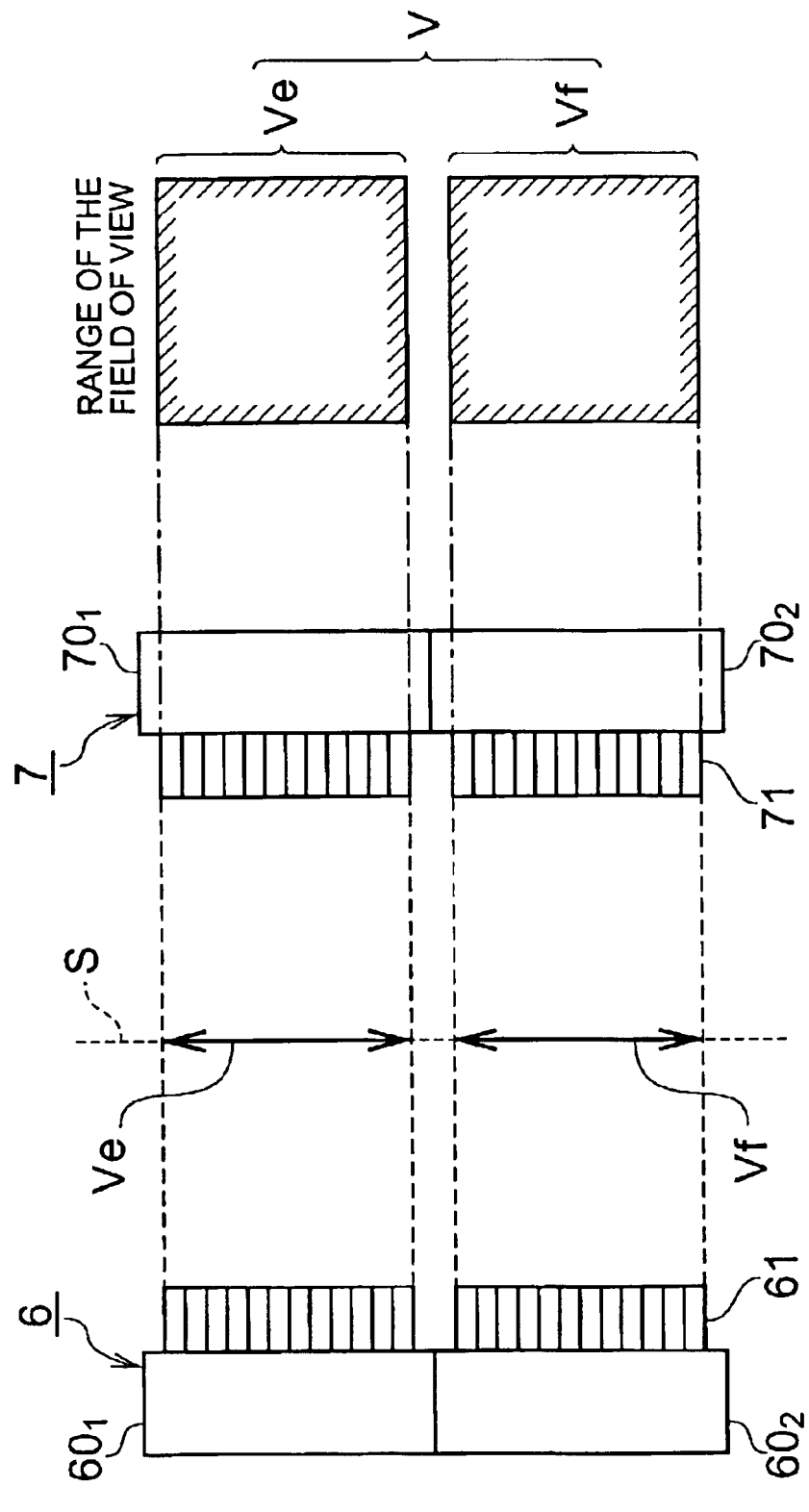
FIG. 9 shows a side view and plan view of the range of the field of view in a conventional device in the case of two pairs of two-dimensional radiation detectors disposed oppositely.

On the right side relative to the side view in FIG. 2, as in FIG. 9, the measurement surface S is shown in a plan view as seen from the Z axis direction as the range of the field of view that can be measured with this imaging device. Because coincidence counting is carried out with the set of radiation detectors positioned diagonally in the present embodiment, a range of the field of view Vc (cross plane) resulting from coincidence counting by the diagonal radiation detectors $10_1$ and $20_2$, or the radiation detectors $10_2$ and $20_1$ is attained, in addition to the range of the field of view va (direct plane) resulting from coincidence counting with the directly opposite radiation detectors $10_1$ and $20_1$ and the range of the field of view Vb (also a direct plane) resulting from coincidence counting by the radiation detectors $10_2$ and $20_2$.

With this type of expansion of the range of the field of view, one pair of radiation detectors is added to two pairs of detectors (doubling the number of detectors) and a range of the field of view V, more than twice as large, is attained overall. Moreover, in FIG. 2, the tracks of the gamma ray pair, emitted in opposite directions due to electron-positron pair annihilation occurring at the point P and detected by each of the scintillator arrays 11 and 21 of the radiation detectors $10_1$ and $20_2$, is shown as an example.

In this way, it is possible to supplement the insensitive region between the areas Va and Vb, resulting from the direct plane corresponding to the oppositely positioned radiation detector pairs, by performing coincidence counting for diagonally disposed radiation detectors and establishing a range of the field of view for measuring the range Vc, resulting from the cross plane on the measurement surface S. Consequently, it becomes possible to expand the range of the field of view beyond the number of additional radiation detectors; and it becomes possible to realize a more efficient expansion of the range of the field of view with increasing the radiation detector pairs. At the same time, it becomes possible to lower the costs of the device while simplifying the device constitution because the number of radiation detectors necessary for ensuring the required range of the field of view is reduced.

In the arrangement of the scintillator arrays 11 and 21 in the detector groups 1 and 2, the positions for establishing each of the radiation detectors $10_1$ and $10_2$, $20_1$ and $20_2$ is determined so that a prescribed detecting portion arrangement spacing L2 (L2>0) is formed between the scintillator arrays 11 or the scintillator arrays 21 adjacent in the Y axis direction, as discussed above in relation to FIG. 1. This detecting portion arrangement spacing L2 is preferably no more than the distance L1 in the Y axis direction (detecting portion length) of the scintillator arrays 11 and 21.

Like the direct range of the field of view Va or Vb between opposite detectors, the crossed range of the field of view Vc, formed by performing coincidence counting for diagonal detectors, has approximately the same form and area as the radiation incident surfaces of the scintillator arrays 11 and 21. Consequently, by having the abovementioned detecting portion arrangement spacing L2 be no more than the detecting portion length L1, it becomes possible to supplement the entire area between the two ranges of the fields of view Va and Vb with the range of the field of view Vc. At the same time, it becomes possible to attain a wide range of the field of view V comprising, as a whole, a series of areas that do not include an insensitive region, while more than doubling the resulting range of the field of view, as compared with the range of the field of view attained with the constitution of one pair of detectors.

In particular, in the constitution in FIG. 2, the detectors in each of the detector groups 1 and 2 are disposed so that the detecting portion arrangement spacing L2 becomes equal to the detecting portion length L1. At the same time, because the position and area at which the range of the field of view Vc is generated match the area of the measurement surface S between the ranges of the fields of view Va and Vb, the ranges of the fields of view resulting from the direct plane and cross plane are made continuous without overlapping each other and it becomes possible to ensure the maximum range of the field of view, which is three times the range of the field of view attained with one pair of detectors.

This detecting portion arrangement spacing L2 may also be spacing greater than the detecting portion length L1. In this case, an insensitive region which is not included in the field of view occurs between the direct ranges of the fields of view Va and Vb and the cross range of the field of view Vc. However, because the expansion of the range of the field of view reaches the maximum, this expansion of the range of the field of view resulting from such a device constitution is effective depending on the purpose thereof. Also, the position of the measurement surface S does not necessarily need to be at the central position between the detector groups 1 and 2 and may also be established in a plane separated from the central position and perpendicular to the direction in which the detector groups are in opposition (Z axis direction).

Moreover, a positron imaging device for performing coincidence counting between diagonal detectors is disclosed in Japanese Patent Application Laid-open No. H 09-33658. However, the abovementioned device is one where arrays of one-dimensional arrangements of a plurality of zero-dimensional radiation detectors are disposed in opposition, and the basic constitution is different from the imaging device relating to the present invention. In particular, in the opposite arrangement of the zero-dimensional radiation detectors, the field of view attained by coincidence counting between each of those detectors is in the form of a point.

On the other hand, the positron imaging device relating to the present invention relates to the constitution of a device wherein two-dimensional radiation detectors are disposed in opposition. In this case, the field of view attained by coincidence counting between the detectors is a visual plane. With this visual plane, efficient expansion of the range of the field of view is made possible by supplementing the direct plane with a cross plane therebetween.

The method for forming images (imaging) of measured subjects with the abovementioned imaging device is further explained using FIGS. 3A through 3D. For simplicity, in FIGS. 3A through 3D, the method for forming images is illustrated with an example of detecting a gamma ray pair by one pair of radiation detectors 10 and 20 disposed in opposition. Even in the case where the pairs of radiation detectors are increased and coincidence counting is performed for directly opposite and diagonal sets of radiation detectors, as shown in FIGS. 1 and 2, the basic method for forming images is the same as shown in FIGS. 3A through 3D.

Figure 3A:
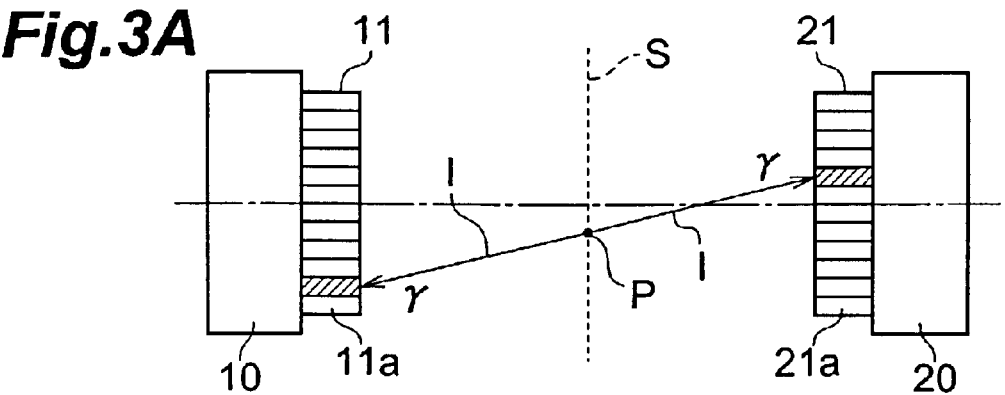
FIG. 3A through FIG. 3D are drawings showing the method for forming an image with a positron imaging device.
Figure 3B:
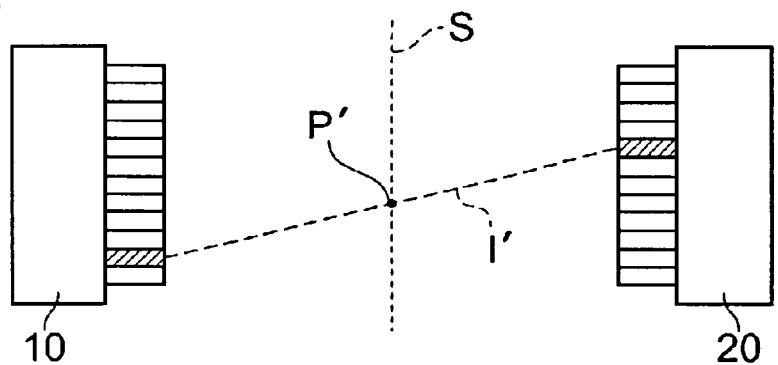

When a positron-emitting nuclide in the tracer present in the measured subject emits a positron at the point P on the measured surface S, the positron undergoes electron-positron pair annihilation with an electron in the material and a pair of gamma rays is emitted along the track 1 in mutually opposite directions (FIG. 3A). The gamma ray pair is incident on the scintillators 11a and 21a of each of the radiation detectors 10 and 20 and is detected. In the drawing, an example is shown wherein each gamma ray is incident on the second scintillator from the bottom of the scintillator array 11 and the fifth scintillator from the top of the scintillator array 21.

The detection of the two gamma rays is simultaneous and therefore an electron-positron pair annihilation event resulting from a gamma ray pair as shown in FIG. 3A is selected by performing coincidence counting of the first detection signal from the radiation detector 10 and the second detection signal from the radiation detector 20. Furthermore, the calculation of the position at which the pair annihilation occurred is performed as discussed below for the selected event.

For the two scintillators that detected the gamma rays, the central position of each of the radiation incident surfaces is set as the gamma ray incident position, and the coincidence count line 1' connecting those two points (FIG. 3B) is generated. Furthermore, the position P' at which the pair annihilation occurred for that event is determined from the intersection of the coincidence count line 1' and the measured surface S. This coincidence count line 1' and position P' at which the pair annihilation occurred match the actual gamma ray track 1 and position P' at which the pair annihilation occurred within a position resolving range determined by the size and so forth of each of the scintillators 11a, 21a.

Figure 3C:
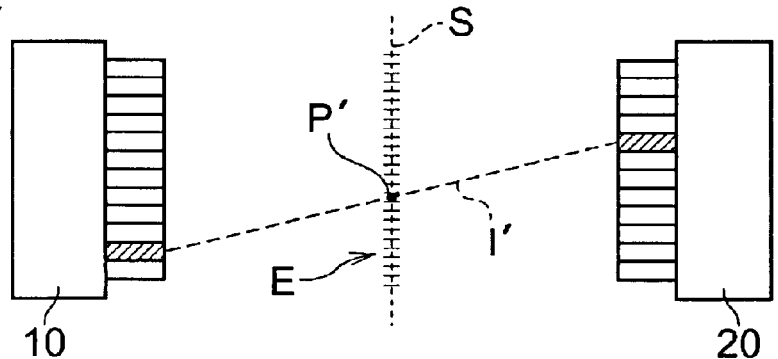

In actual image formation, according to a prescribed resolution established according to the position resolution and so forth of the radiation detectors 10 and 20, the measurement surface S is divided into small areas and digitized to form a plurality of pixels constituting the image (FIG. 3C). An image of the distribution of matter or the like in the measured subject on the measurement surface S is generated by adding the number of electron-positron pair annihilation events that occurred for each pixel on the basis of the calculated position P' at which pair annihilation occurred.

Figure 3D:
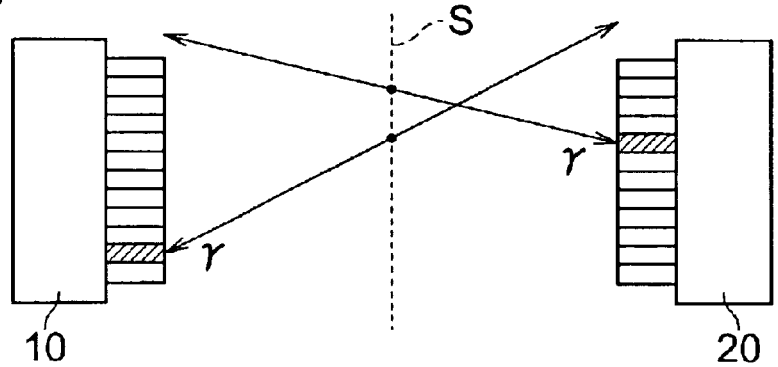

Moreover, as shown in FIG. 3D, it is sometimes the case that two gamma rays, other than a gamma ray pair from electron-positron pair annihilation, are detected by the two detectors, such as single gamma rays incident on the radiation detectors 10, 20, from among the gamma ray pairs from the electron-positron pair annihilations that occurred at different positions. However, in the case of such an event, the timing of the gamma ray detection is rarely equal. Such incidents are therefore removed in the coincidence counting circuit 50 of the signal processing circuit 5 and are not selected as electron-positron pair annihilation events used in measurement.

FIG. 4 is a drawing showing the constitution of a second embodiment of the positron imaging device. Moreover, in the following embodiment, the constitution is shown with the first detector group 1 seen in a plan view from the Z axis and the second detector group 2 and signal processing circuit 5 are not shown. The second detector group 2 positioned opposite to the first detector group 1 has the same constitution as the first detector group 1. The constitution of the signal processing circuit 5 is entirely the same as in the embodiment shown in FIG. 1.

To explain the range of the field of view and its expansion, the radiation detectors 10 are shown as outward forms of the range of the areas of the radiation incident surfaces for detecting gamma rays of the scintillator array 11 which is the radiation detecting portion. However, the arrangement of the scintillators 11a in each scintillator array 11 is not shown.

In the present embodiment, the first detector group 1 is constituted with a detector array wherein the plurality of radiation detectors 10 is disposed two-dimensionally in an array with prescribed arrangement spacing with the X axis and Y axis as the two arrangement directions. With respect to the length LX1 in the direction of the X axis and the length LY1 in the direction of the Y axis of the scintillator array 11, each detector is disposed so that the detecting portion arrangement spacing LX2 in the X axis direction and the detecting portion arrangement spacing LY2 in the Y axis direction between the scintillator arrays 11 become no more than the detecting portion lengths LX1, LX1 corresponding thereto.

At this time, by performing coincidence counting for each of the radiation detectors 10 with the oppositely disposed radiation detectors and the diagonally disposed radiation detectors of the second detector group, it becomes possible to make the area corresponding to the entire detector array become the measurable range of the field of view. The coincidence counting between the diagonal detectors in the embodiment shown in FIG. 1 is according to the detectors disposed above and below (Y axis direction) as seen from the XY plane. On the other hand, because the detectors are in a two-dimensional array in the present embodiment, it is possible to carry out diagonal coincidence counting between the detectors disposed vertically, horizontally, or diagonally (diagonal direction). For example, for the 2×2 radiation detectors $10_1$, $10_2$, $10_3$, and $10_4$ positioned in the upper left of FIG. 4, the areas therebetween are shown divided by dotted lines (five areas, above, below, left, right, and center between each of the detectors). By coincidence counting of the opposite detectors with these four radiation detectors $10_1$, $10_2$, $10_3$, and $10_4$ and the four radiation detectors (not shown) of the second detector group 2 positioned opposite thereto, the four direct planes corresponding to each area where the detector is situated are made the range of the field of view. With coincidence counting of diagonal detectors, the five cross planes corresponding to each area between the detectors shown divided with dotted lines become the range of the field of view. As a whole, then, the total area surrounded by the four pairs of radiation detectors becomes a continuous range of the field of view.

Consequently, in this case where the number of detectors is increased by four times, the range of the field of view is expanded by more than four times. In particular, the range of the field of view is expanded the maximum of nine times in the case where the detecting portion length and detecting portion arrangement spacing are made equal with LX2=LX1 and LY2=LY1. Furthermore, for the similarly arranged radiation detectors 10 other than the abovementioned four, the coincidence counting among the detectors 10 and the expansion of the range of the field of view thereby are performed in the same way. Moreover, a number of radiation detectors in a two-dimensional arrangement may be established appropriately in view of the necessary range of the field of view or the like.

Furthermore, with regards to the specific method for establishing the radiation detectors in the present embodiment, the two radiation detectors 10 adjacent in the Y direction, such as the radiation detectors $10_1$ and $10_2$, are combined with each other and these are fixed within a detector case 31 as a radiation detector module 30 comprising two radiation detectors 10. The overall detector array is constituted by arranging these radiation detector modules 30 in a two-dimensional arrangement as shown in FIG. 4. Moreover, in FIG. 4, a radiation detector module 30 located in the upper left is shown surrounded by a thick line.

In the case of constituting a detector group 1 with a two-dimensional arrangement of a plurality of radiation detectors 10, a plurality of radiation detectors 10 is formed into modules in advance as radiation detector modules 30. By increasing the number of those modules 30, the process of determining and fixing the positions of each of the detectors is simplified. It becomes even easier to increase the number of detectors and expand the range of the field of view thereby. Also, it becomes possible to reduce the costs of the device in comparison with establishing a detector case for each individual detector.

For the constitution of the individual radiation detector modules 30, it is preferable to establish the arrangement of the detectors 10 in the modules 30 and the exterior form of the detector cases 31 so as to realize the arrangement of the radiation detectors 10 that is the object when arranging the modules 30. In FIG. 4, the modules 30 have a structure that is symmetrical in both the directions of the X axis and Y axis. The length LX3 on the left and right ends and the length LY3 on the upper and lower ends are established so that LX3=LX2/2 and LY3=LY2/2.

Also, for the outer dimensions LX and LY of the entire module 30, LX=LX1+LX2 and LY=2×(LX1+LY2). In the case of adding a condition that LX2≦LX1 and LY2≦LY1 so as not to cause an insensitive area that cannot be measured between the direct and cross ranges of the fields of view, these outer dimensions are in the range of LX1<LX≦2×LX1 and 2×LY1<LY≦4×LY1 with respect to the outer dimensions of the scintillator array 11 of the radiation detector 10.

Figure 5:
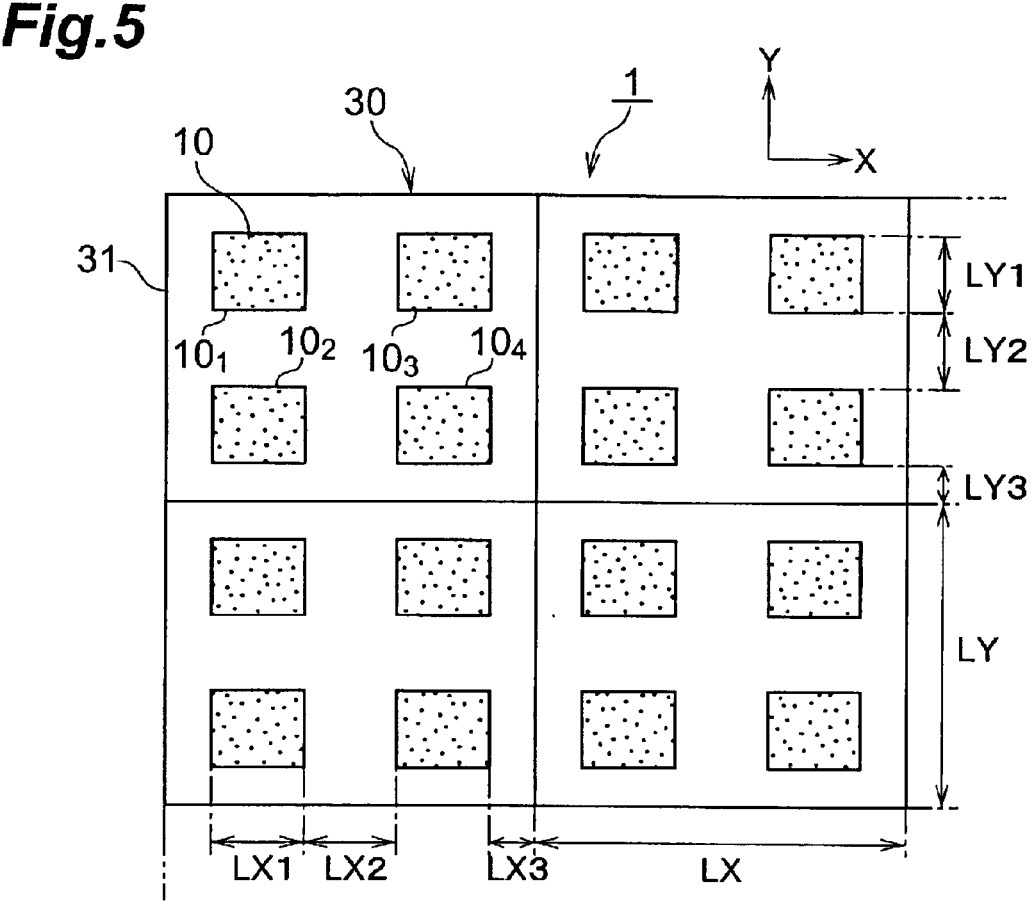
FIG. 5 is a drawing showing the constitution of a third embodiment of the positron imaging device.

FIG. 5 is a drawing showing the constitution of a third embodiment of the positron imaging device. This embodiment is the same as the second embodiment discussed above regarding the two-dimensional arrangement of the radiation detectors 10. On the other hand, these vary regarding the specific method for establishing the radiation detectors. In the second embodiment, the radiation detector modules 30 were constituted from two radiation detectors 10 arranged in the Y axis direction. In the present embodiment, each of the radiation detector modules 30 is constituted by arranging four radiation detectors 10 in a 2×2 arrangement with respect to the X and Y axis directions, such as the radiation detectors $10_1$ through $10_4$, and fixing these within the detector case 31. Particularly in the case of an increasing number of radiation detectors 10 arranged within the imaging device as a whole, it becomes simple to add more detectors by using radiation detector modules 30 with a greater number of radiation detectors therein.

Figure 6:
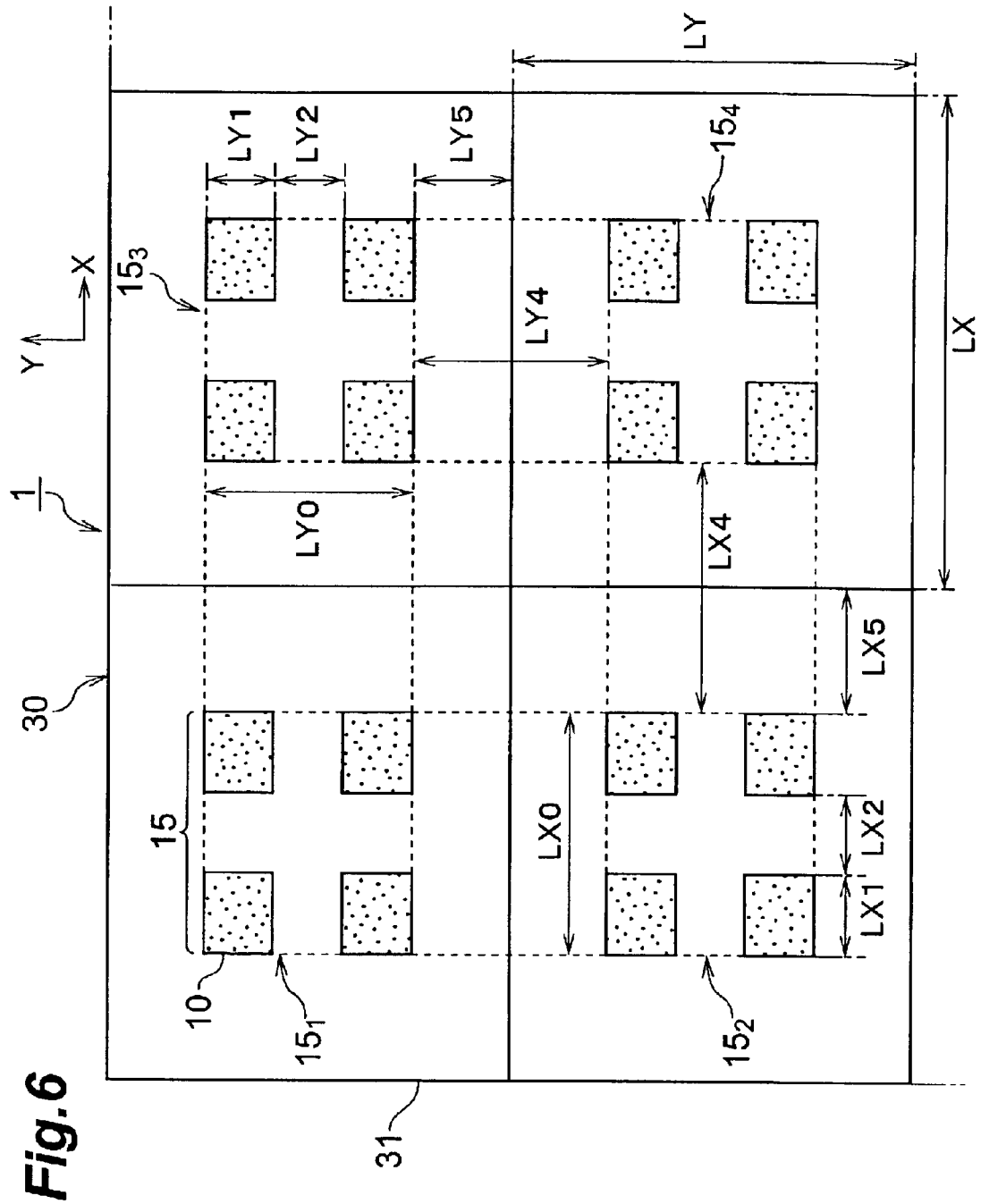
FIG. 6 is a drawing showing the constitution of a fourth embodiment of the positron imaging device.

FIG. 6 is a drawing showing the constitution of a fourth embodiment of the positron imaging device. In the second and third embodiments, the detector groups are constituted by a single detector array wherein the radiation detectors are arranged so a uniform detecting portion arrangement spacing is established throughout. On the other hand, the imaging device in the present embodiment has the detector groups constituted overall by a plurality of detector arrays further arranged in an array.

In the present embodiment, a detector array 15 is constituted from a total of four radiation detectors 10 in a two-dimensional 2×2 arrangement with respect to the X and Y axis directions. For the constitution of this detector array 15, conditions and so forth for the detecting portion lengths LX1 and LY1 and the detecting portion arrangement spacing LX2 and LY2 for the scintillator arrays 11 of the radiation detectors 10 are the same as in the case of the single detector array in the other embodiments discussed above. For the arrayed detecting portions comprising the scintillator arrays 11 of the radiation detectors 10 associated with each of the detector arrays 15 as shown in FIG. 6, the length in the X axis direction becomes LX0 =2×LX1+LX2 and the length in the Y axis direction becomes LY0=2×LY1+LY2.

Furthermore, the entire first detector group 1 is constituted by a two-dimensional array of the detector arrays 15, each comprising four radiation detectors 10, with a uniform arrangement spacing therebetween in the X and Y axis directions. The array arrangement spacing between the detector arrays 15 (spacing between the array detecting portions, specifically the spacing between the ends of the scintillator arrays 11) is LX4 in the X axis direction and LY4 in the Y axis direction as shown FIG. 6.

These array arrangement spacing LX4 and LY4 are established so as to be greater than the detecting portion arrangement spacing LX2 and LY2. At this time, it becomes possible to realize more efficient enlargement of the range of the field of view by applying, to the two-dimensional arrangement of the detector arrays 15, the same method as used for constituting the range of the field of view for the direct plane range of the field of view and for supplementing the range of the field of view with the cross plane, with the two-dimensional arrangement of the radiation detectors 10.

Specifically, it becomes possible to have a measurable range of the field of view for the entire area of the detector group by carrying out coincidence counting for opposite arrays and diagonal arrays, for the detector arrays 15 and the detector arrays in the second detector group disposed opposite thereto. For example, the 2×2 detector arrays $15_1$, $15_2$, $15_3$, and $15_4$ in FIG. 6 are shown with the areas therebetween divided by dotted lines.

The four direct planes corresponding to each area where the arrays are disposed are made the range of the field of view by coincidence counting between the opposite arrays for the four detector arrays $15_1$, $15_2$, $15_3$, and $15_4$ and the four detector arrays (not shown) of the second detector group 2 disposed opposite thereto. Also, the five cross planes corresponding to each area between the arrays shown divided by dotted lines are made the range of the field of view by coincidence counting between diagonal arrays. The expansion of the range of the field of view is thereby realized overall.

If the radiation detectors 10 are seen as individual units, the direct planes between the opposite arrays match the four direct planes and five cross planes between the detectors as explained in the abovementioned other embodiments. Likewise, the cross planes between diagonal arrays match the nine cross planes between the detectors.

By making the array arrangement spacing LX4 and LY4 no more than the lengths LX0, LY0 of each of the detector arrays 15, the entire area surrounded by the four pairs of detector arrays can be made a continuous range of the field of view. The range of the field of view becomes its widest in the case where the array lengths and array arrangement spacing are equal with LX4=LX0 and LY4=LY0. At this time, the range of the field of view is expanded 81 times with the establishment of 16 pairs of radiation detectors 10, as compared to the case of one pair of detectors, and a great expansion of the range of the field of view is realized.

Relating to the specific method for establishing the radiation detectors in the present embodiment, a radiation detector module 30 is constituted from four radiation detectors 10 constituting each detector array 15 and a detector group is constituted with an arrangement of those modules 30. A module 30 has a structure that is symmetrical in both the X axis and Y axis directions. The horizontal length LX5 and the vertical length LY5 at the end portions are established so that LX5=LX4/2 and LY5=LY4/2.

Also, the exterior dimensions LX and LY of the entire module 30 are such that LX=2×LX1+LX2+LX4 and LY=2×LY1+LY2+LY4. In the case of applying the conditions that LX4≦LX0 and LY4≦LY0 so that an insensitive area does not occur between the ranges of the fields of view, these exterior dimensions are in the range of 2×LX1<LX≦6×LX1 and 2×LY1<LY≦6×LY1.

The positron imaging device relating to the present invention is not limited to the embodiment discussed above and various modifications and changes may be made to the constitution. For example, the detecting portion arrangement spacing between the radiation detectors is preferably no more than the detecting portion length as discussed above, but it is possible to expand the range of the field of view by supplementing the range of the field of view corresponding to the insensitive area between the detectors even in a constitution where the spacing is greater than the detecting portion length. Also, the array arrangement spacing between the detector arrays can likewise be established to be greater than the array length. In this case, however, an insensitive area sometimes occurs in the range of the field of view.

Furthermore, the measurement surface established at a position between the two detector groups may be established at the central position between the two detector groups or at a position other than that, in consideration of the arrangement of the radiation detectors or detector arrays and the resulting range of the field of view at each position.

Figure 7A:
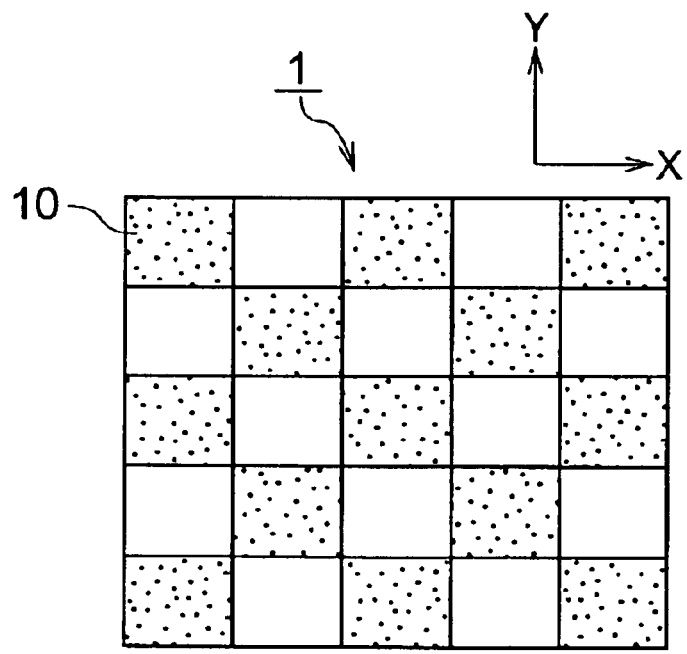
FIG. 7A and FIG. 7B are drawings showing examples of other embodiments of the positron imaging device.

Also, the two-dimensional arrangement of the radiation detectors was a two-dimensional array arrangement in the embodiments discussed above. However, various other arrangement methods are possible. FIG. 7A shows an example of such a two-dimensional arrangement. The imaging device in FIG. 7A is a constitution wherein the radiation detectors 10 are disposed alternately. In this case, coincidence counting need not be performed between the detectors disposed diagonally in the drawing because other detectors are disposed in the areas therebetween.

Also, the arrangement spacing between the detectors do not need to be uniform spacing. For example, in a case of arranging radiation detectors with different shapes and sizes, the arrangement spacing at each position may be established in consideration thereof.

Figure 7B:
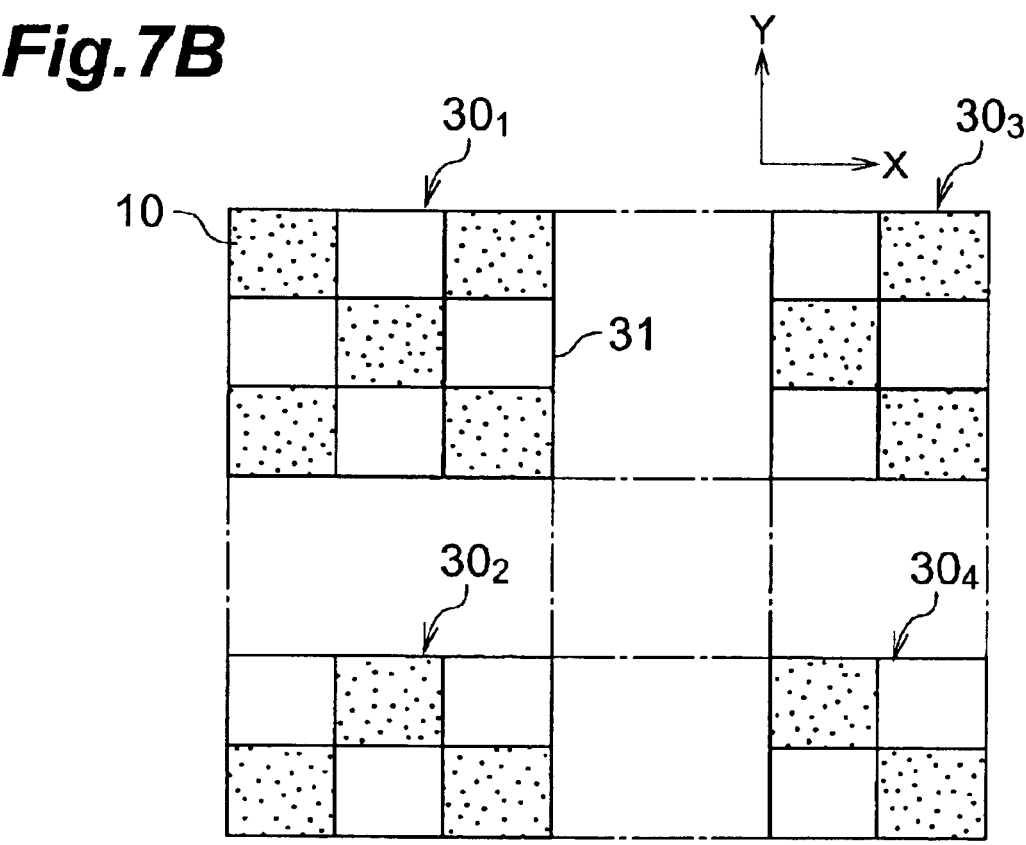

Also, the radiation detector modules do not all need to have the same constitution and an increased number of radiation detectors may be established with the use of modules having different constitutions. For example, with the detector arrangement in FIG. 7A, a constitution is also possible as shown in FIG. 7B by establishing additional modules 30 ($30_1$ through $30_4$) having different numbers of detectors and which are of different sizes. Also, the method for establishing and adding radiation detectors may be carried out by adding a plurality of detectors one by one without using modules.

In the case of using a plurality of radiation detectors in modules, it is possible to ensure the necessary detecting portion arrangement spacing or array arrangement spacing and to realize a two-dimensional arrangement of the detectors or detector arrays, by eliminating or reducing the end length of the four edges of the modules and establishing the elements of the appropriate length and shape to become spacers between modules.

Industrial Applicability

The positron imaging device relating to the present invention comprises two detector groups disposed oppositely and each comprising a plurality of radiation detectors. This imaging device can be used as a positron imaging device wherein the areas between the detecting portions of each of the radiation detectors disposed with spacing therebetween are supplemented by coincidence counting between diagonal detectors and are placed within the range of the field of view, and wherein an efficiently expanded range of the field of view, greater than that from increasing the number of detectors, is realized.

At this time, because of the reduction of the number of radiation detectors to ensure the range of the field of view required as the area necessary for measurement, the constitution of the detector groups and signal processing circuit are simplified and a low-cost device is realized. Also, because the constitution of the range of the field of view has a great degree of freedom, the constitution of the device may be varied according to the various measurement purposes.

What is claimed is:

1. A positron imaging device to attain an image of a measured subject by coincidence counting of a gamma ray pair generated by electron-positron pair annihilation in said measured subject and emitted in mutually opposite directions, comprising:

a first detector group having a prescribed number, that is two or more, of radiation detectors disposed two-dimensionally including radiation detecting portions constituted so that two-dimensional position detection is possible, in which each of said radiation detectors is arranged so that said radiation detecting portion is disposed with an arrangement spacing from the radiation detecting portion of said radiation detector adjacent thereto;

a second detector group having said prescribed number of said radiation detectors and in which each of said radiation detectors is arranged so as to be opposite said corresponding radiation detectors of said first detector group; and signal processing means to which are input a first detection signal output from said first detector group and a second detection signal output from said second detector group, and for carrying out coincidence counting of said first detection signal and said second detection signal;

wherein said signal processing means carry out coincidence counting of said first detection signal output from each of said radiation detectors constituting said first detector group with said second detection signals output from a plurality of said radiation detectors including said opposed radiation detector from among said radiation detectors constituting said second detector group;

wherein each of said first detector group and said second detector group comprises a detector array in which a plurality of said radiation detectors are arranged in an array along a first direction and second direction which are perpendicular to each other, so that said radiation detecting portions of said adjacent radiation detectors are disposed with a prescribed detecting portion arrangement spacing therebetween; and wherein, in each of said first detector group and said second detector group, a plurality of said detector arrays are arranged in an array along said first direction and said second direction, so that, with respect to the arrayed detecting portions constituted by said radiation detecting portions of said radiation detectors included in said detector arrays, said arrayed detecting portions of said adjacent detector arrays are disposed with a prescribed array arrangement spacing, that is greater than said detecting portion arrangement spacing therebetween.

2. The positron imaging device, according to claim 1, wherein said array arrangement spacing in said first direction is no more than the length in said first direction of said arrayed detecting portion; and said array arrangement spacing in said second direction is no more than the length in said second direction of said arrayed detecting portion.

3. The positron imaging device, according to claim 1, wherein said radiation detecting portion is a scintillator array of a plurality of scintillators arranged in a two-dimensional array.

4. The positron imaging device, according to claim 1, wherein each of said first detector group and said second detector group comprises a radiation detector module in which a plurality of said radiation detectors is contained and modularized within a detector case.

5. A positron imaging device to attain an image of a measured subject by coincidence counting of a gamma ray pair generated by electron-positron pair annihilation in said measured subject and emitted in mutually opposite directions comprising:

a first detector group having a prescribed number, that is two or more, of radiation detectors disposed two-dimensionally including radiation detecting portions constituted so that two-dimensional position detection is possible, in which each of said radiation detectors is arranged so that said radiation detecting portion is disposed with an arrangement spacing from the radiation detecting portion of said radiation detector adjacent thereto;

a second detector group having said prescribed number of said radiation detectors and in which each of said radiation detectors is arranged so as to be opposite said corresponding radiation detectors of said first detector group; and signal processing means to which are input a first detection signal output from said first detector group and a second detection signal output from said second detector group, and for carrying out coincidence counting of said first detection signal and said second detection signal;

wherein said signal processing means carry out coincidence counting of said first detection signal output from each of said radiation detectors constituting said first detector group with said second detection signals output from a plurality of said radiation detectors including said opposed radiation detector from among said radiation detectors constituting said second detector group;

wherein each of said first detector group and said second detector group comprises a detector array in which a plurality of said radiation detectors are arranged in an array along a first direction and second direction which are perpendicular to each other, so that said radiation detecting portions of said adjacent radiation detectors are disposed with a prescribed detecting portion arrangement spacing therebetween; and wherein said detecting portion arrangement spacing in said first direction is no more than the length in said first direction of said radiation detecting portion; and said detecting portion arrangement spacing in said second direction is no more than the length in said second direction of said radiation detecting portion.

6. The positron imaging device, according to claim 5, wherein each of said first detector group and said second detector group comprises a radiation detector module in which a plurality of said radiation detectors is contained and modularized within a detector case.

7. The positron imaging device, according to claim 5, wherein said radiation detecting portion is a scintillator array of a plurality of scintillators arranged in a two-dimensional array.

8. The positron imaging device, according to claim 5, wherein said array arrangement spacing in said first direction is no more than the length in said first direction of said arrayed detecting portion; and said array arrangement spacing in said second direction is no more than the length in said second direction of said arrayed detecting portion.

* * * * *